(12) United States Patent
Van Sprang et al.

(10) Patent No.: US 11,123,834 B2
(45) Date of Patent: Sep. 21, 2021

(54) MACHINE TOOL UNIT WITH AXIAL RUN-OUT ERROR MONITORING, AND TESTING METHOD FOR THE CLAMPING STATE

(71) Applicant: FRANZ KESSLER GMBH, Bad Buchau (DE)

(72) Inventors: Joachim Van Sprang, Ravensburg (DE); Harald Weing, Biberach (DE)

(73) Assignee: Franz Kessler GmbH, Bad Buchau (DE)

( * ) Notice: Subject to any disclaimer, the term of this patent is extended or adjusted under 35 U.S.C. 154(b) by 165 days.

(21) Appl. No.: 16/440,143

(22) Filed: Jun. 13, 2019

(65) Prior Publication Data

US 2019/0381623 A1     Dec. 19, 2019

(30) Foreign Application Priority Data

Jun. 15, 2018 (EP) .................................. 18178007

(51) Int. Cl.
*B23Q 17/22* (2006.01)
*B23Q 17/00* (2006.01)
(Continued)

(52) U.S. Cl.
CPC ....... *B23Q 17/2216* (2013.01); *B23Q 17/003* (2013.01); *G01B 7/30* (2013.01);
(Continued)

(58) Field of Classification Search
CPC .............. B23Q 17/2225; B23Q 17/003; B23Q 17/005; B23Q 15/14; B23Q 17/002;
(Continued)

(56) References Cited

U.S. PATENT DOCUMENTS 7,331,741 B2 *  2/2008  Murota ................ B23Q 17/003
                                                        409/134
2008/0045391 A1   2/2008  Martens
(Continued)

FOREIGN PATENT DOCUMENTS

DE             101 44 643 A1    6/2003
DE      10 2006 016 919 A1     10/2007
(Continued)

OTHER PUBLICATIONS

Japanese Office Action (Application No. 2019-111453) dated Sep. 29, 2020.
(Continued)

*Primary Examiner* — Tung X Nguyen
*Assistant Examiner* — Feba Pothen
(74) *Attorney, Agent, or Firm* — Burr & Brown, PLLC

(57) ABSTRACT

Proposed is a machine tool unit with a stator unit and a rotor unit which is rotatable about an axis of rotation, wherein the rotor unit comprises a spindle head with a tool-holding unit having a tool-clamping device, wherein a testing device is provided for testing the clamping state of the tool, the testing device having precisely one sensor head for sensory detection. To improve the precision, the sensor head is arranged at a fixed position on the stator unit in such a manner that it measures the distance to an end-side part of the spindle head rotating relative to the sensor head, wherein the testing device is designed to record a temporal/position-related sequence of at least two distance values and/or of at least two successive series of in each case at least two distance values, in order to determine an axial run-out error.

14 Claims, 2 Drawing Sheets

(51) Int. Cl.
  *G01B 7/30* (2006.01)
  *B23Q 17/24* (2006.01)
  *B23Q 23/00* (2006.01)

(52) U.S. Cl.
  CPC ........ *B23B 2260/128* (2013.01); *B23Q 17/22* (2013.01); *B23Q 17/2428* (2013.01); *B23Q 23/00* (2013.01); *B23Q 2717/00* (2013.01); *F16C 2322/39* (2013.01)

(58) Field of Classification Search
  CPC ................ B23Q 17/0952; B23Q 17/22; B23Q 17/2476; B23Q 1/0009; B23Q 1/70; B23Q 2017/001; B23B 2260/128; B23B 31/028; B23B 31/261; B23B 31/305; G01L 1/005
  See application file for complete search history.

(56) References Cited

U.S. PATENT DOCUMENTS

| | | |
|---|---|---|
| 2010/0188282 A1 | 7/2010 | Bonerz et al. |
| 2010/0305898 A1* | 12/2010 | Yamaguchi ............ B23Q 17/22 702/147 |
| 2016/0349039 A1 | 12/2016 | Marsh et al. |

FOREIGN PATENT DOCUMENTS

| | | |
|---|---|---|
| EP | 1 593 456 A1 | 11/2005 |
| EP | 1 889 685 B1 | 3/2010 |
| JP | 5-050359 B2 | 3/1993 |
| JP | 6-235422 B2 | 8/1994 |
| JP | 2003-181747 A1 | 7/2003 |
| JP | 2010-167557 A1 | 8/2010 |
| JP | 2011-093065 A1 | 5/2011 |
| JP | 2011-191077 A1 | 9/2011 |
| JP | 2012-052813 A1 | 3/2012 |

OTHER PUBLICATIONS

European Search Report (Application No. 18 17 8007) dated Oct. 31, 2018.

* cited by examiner

MACHINE TOOL UNIT WITH AXIAL RUN-OUT ERROR MONITORING, AND TESTING METHOD FOR THE CLAMPING STATE

This application claims the benefit under 35 USC § 119(a)-(d) of European Application No. 18 178 007.3 filed Jun. 15, 2018, the entirety of which is incorporated herein by reference.

FIELD OF THE INVENTION

The present invention relates to a motor-driven machine tool unit and a method for testing the clamping state.

BACKGROUND OF THE INVENTION

From the prior art, for example, from EP 1 889 685 B1, a machine tool is known in the case of which, by means of a dial gauge, the surface contour of the circumferential surface of the spindle head is inspected with regard to whether deformation is present. Such a deformation is then attributed to the fact that a chip has been clamped in the region between tool outer surface and the inner surface of the tool holder.

SUMMARY OF THE INVENTION

It is an object of the present invention to propose a motor-driven machine tool unit and a testing method for the clamping state with which the precision of the machining by means of the corresponding machine tool can be improved.

The motor-driven machine tool unit according to the present invention comprises a stator unit and a rotor unit, wherein the rotor unit is mounted so as to be rotatable about an axis of rotation. The rotor unit which rotates relative to the stator unit generally belongs to a motor spindle drive. To hold a tool, a tool-holding unit is provided, which is in turn part of the spindle head of the rotor unit. Here, the tool to be held in the tool-holding unit is, for the holding action, clamped by means of a tool-clamping device. In turn, for the clamping action, the tool-clamping device is acted on with a clamping force and is adjusted in the longitudinal direction of the axis of rotation. Here, a part of the clamping device may, for example, be pulled into a tapering holder, such that the tool can in turn be clamped with a radially acting force. By releasing the clamping force, it is also possible, in turn, for the clamped tool to be released.

According to the present invention, a testing device is provided for testing the clamping state of the tool, the testing device having precisely one sensor head for sensory detection, whereby it is basically already possible for costs to be saved, because it is often the case that multiple sensors are used in conventional machine tools from the prior art. The sensor head comprises the structural unit itself or the sensor itself which ultimately performs the sensory detection. The testing device as a whole may, for example, comprise evaluation electronics and/or an electronics unit for processing the sensor data.

Accordingly, the machine tool unit according to the present invention is characterized in that the sensor head is arranged at a fixed position on the stator unit in such a manner that it measures the distance to an end-side part of the spindle head rotating relative to the sensor head. The sensor head is thus arranged so as to be static relative to the rotor unit, that is to say, the sensor is not one which co-rotates with the rotor unit, it rather being possible for the sensor head to be assigned to the stator unit. The sensor head advantageously measures a distance which runs substantially parallel to the axis of rotation, that is to say, to an end-side part of the spindle head. Here, the machine tool unit according to the present invention utilizes the fact that a deformation caused by a chip readily has an effect not only on the circumferential surface, with changes however also being observed in the region of the end side of the rotor unit or of the spindle head. In the event of axial run-out errors, the spindle head will generally also be deformed at the end side and/or else be displaced with regard to its orientation relative to the axis of rotation by the axial run-out error, such that in this case, too, an end-side displacement of the rotor unit can be detected.

By means of the arrangement of the sensor head which permits an end-side distance measurement, it is thus advantageously possible to record a much broader spectrum of errors. Furthermore, such an arrangement offers the advantage that a slimmer and more space-saving design of the machine tool unit is possible.

Furthermore, a method according to the present invention for testing the clamping state of a tool clamped in a tool-holding unit of a rotor unit of a motor-driven machine tool unit analogously comprises the following method steps:

providing a sensor head for determining a distance, arranging the sensor head at a fixed position on the stator unit, measuring the distance of the sensor head from an end-side part of the rotor unit, recording a temporal and/or position-related sequence of the distance values measured with the sensor head, and determining an axial run-out error exclusively taking into consideration the temporal sequence of the measured distance values to the end-side part of the spindle head rotating relative to the sensor head.

In particular, precisely one sensor head is used to record the distance values. The sensor head, which is part of the stator unit, records temporally successive distance values at a fixed location relative to the rotating rotor unit. It is thus also advantageously possible for position-related distance values to be obtained, because the angular speed of the rotor unit in the machine tool is generally known.

The sensor may determine the distance to a surface, which is perpendicular to the sensor or which is inclined, of the rotor unit, possibly of a measuring ring. The measuring surface is generally advantageously situated in the region of the tool interface of the spindle, because typically not errors which arise during the clamping, but also displacements of the rotor unit or of the axis of rotation, are particularly pronounced here.

To permit improved error analysis, the testing device is designed to record a temporal and/or position-related sequence of at least two distance values and/or of at least two successive series of in each case at least two distance values. It is thus possible for an axial run-out error to be determined, for example, solely from the temporal and/or position-related sequence of distance values. By means of this measure, a clamping state can be detected in a particularly effective manner, because typical errors, such as, for example, the presence of a chip in the region of the clamping device, are associated with axial run-out errors which are manifested in the end-side distance of the rotating spindle head to the static sensor head not remaining constant but rather changing in the temporal or position-related sequence.

It is particularly advantageously possible for two series of measured values to be recorded in order to be able to perform a comparison between the two series, for example, the comparison in the case of a clamped tool in the presence of a new or cleaned machine tool unit (as first series) in relation to a machine tool unit during normal operation, during which it is basically to be expected that dirt is also present (as further series). With the first series, an ideal clamping state, or a clamping state which serves as a reference, is thus recorded and is defined as such. The reference values may be used as setpoint values.

In order to test the clamping state comprehensively and accurately, it is possible in one embodiment of the testing method for a series of distance values for each tool used to be recorded as a reference. In particular, it is thus taken into consideration that the tools generally geometrically differ from one another, such that a precise comparison of the measured values is possible. Each tool is itself subject to individual manufacturing tolerances, such that even tools of the same size and of the same type generally do not geometrically correspond, but rather have geometrical errors. The present clamping state can thus be detected very accurately this measure.

Furthermore, by means of the invention, axial run-out errors can be determined much more reliably than has hitherto been possible according to the prior art.

Since a comparison of the profile of the measured values over the spindle rotation is advantageously performed according to the present invention, it is also possible for thermal deformations at the spindle, which are generally processes that take place slowly, to be kept out of the evaluation.

Reference measurements may basically be performed at any time. It may also be expedient to perform measurements at regular intervals and to possibly use more up-to-date datasets as reference measurements. A reference measurement in the new state or in the cleaned state assists in preventing that, for example, no chip passes into the tool receptacle or chuck and falsifies the measurement. A new recording of reference measurements may however be used to check whether the distance values generally change as a result of normal operation, wear or the like.

Contrary to a technical preconception, it is not necessary to use two sensors, which measure a clamping state, for example, at different angular positions in a plane perpendicular to the axis of rotation in order to determine deflections at different angular positions and be able to use the data for the evaluation. Rather, a measurement at a single angular position is sufficient, wherein the comparison in relation to a setpoint value is advantageously taken into consideration.

The rotor unit may have, specifically for the measurement, an additional element relative to which the measurement is performed or relative to which the sensor head measures the distance. Depending on the type of sensor head, it is thus possible for the measuring ring to have the characteristics that are advantageous for the measurement, for example, to be manufactured from a corresponding material or to have measuring markings. By means of the size of the measuring ring, it is also possible, similarly to the situation with a lever, for the action to be intensified, that is to say a small deformation has a more intense effect over a greater distance, such that the testing device can have higher measuring sensitivity and measuring accuracy. In the case of inductive sensors, in particular, eddy current sensors, it may be advantageous if the material used for the measuring ring, whilst being electrically conductive, furthermore however has no ferromagnetic characteristics, but rather only the induction of a voltage has to be taken into consideration. The measuring ring may, for example, be manufactured from aluminum, which is lightweight and which forms a passivating oxide layer on the surface, that is to say is also corrosion-resistant.

In one exemplary embodiment of the present invention, the measuring ring may, for example, be placed onto the spindle head. It is also conceivable for spindle head and measuring ring to be formed integrally, that is to say to be fixedly connected to one another or to be manufactured from one material. The latter embodiment is expedient for manufacturing reasons, for example, if spindle head and measuring ring can be manufactured from the same material. Furthermore, a measuring ring offers the advantage that reference markings may also be applied in virtually any desired manner without the functionality of the rotor unit being impaired, whereby the quality of the measurement can be improved.

If a sequence of measured values is recorded and compared, for example, with a further sequence of measured values, the phase relationship between the two sequences or series of measured values is thus advantageously known. At the least, the assignment of the measured values to be compared should be such that a constant phase relationship is present in order that the evaluation can provide meaningful results. In general, it is advantageous if, between two successive measured values in the respective sequence, there was in each case always a constant time period between the measurements and/or the rotor unit rotated by the same angle, such that, on the basis of the measurement, the angle differences between the positions at which measurements were performed can be reproduced. In one refinement of the present invention, it is advantageously possible for an initial point to be set during the recording of the sequence of distance values. For this purpose, the measuring ring advantageously has a reference marking, for example, in the form of a groove, a bore, some other recess or an elevation. An optical marking is basically also conceivable.

According to the present invention, the distance values are recorded only by one sensor head. The reference marking may, for example, in the case of a recess or elevation, change the distance such that the testing device identifies this as an initial point. It is however also conceivable for the detection of the initial point to be performed exclusively by other sensory means, for example, by means of an optical marking. This may be detected by a separate triggering sensor, which otherwise however provides no distance value for the evaluation, that is to say does not constitute an additional sensor head within the context of the present invention for the distance measurement.

An optical marking may have the advantage that it can be connected to a fast-rotating component with relatively little imbalance. Furthermore, it is also possible for a clearer distinction to be made between a deviation owing to an axial run-out error and the initial point if the reference marking cannot also be interpreted as a deformation, such as is the case with a groove or an elevation.

Various sensor types are basically conceivable which may be used for the sensor head and with which the distance to the rotor unit or to the measuring ring can be determined. It is advantageously possible for contactless distance sensors to be used, because the sensor head is installed on the stator unit and it is sought to determine the distance to a part of the rotor unit. In a particularly preferred refinement of the present invention, an eddy current sensor is used, which is, in particular, generally insensitive to oil, water or non-metallic dust, which are indeed to be expected during the operation of the machine tool. An eddy current sensor may be regarded as an inductive sensor. Exemplary embodiments with capacitive or optical sensors are however also conceivable.

In one refinement of the present invention, in which an eddy current sensor is used, it is advantageously possible for the measuring ring to be manufactured from a non-ferromagnetic material, for example, a para-magnetic material, whereby it is also possible for the measuring accuracy to be increased, because a ferromagnetic material is always under the influence of the magnetic fields prevailing in the machine tool. A ferromagnetic material will therefore, if it has been exposed to a magnetic field, maintain a certain remanence even when an external field is no longer present. If a magnetization of the measuring ring or of that part of the rotor unit relative to which the distance is determined can influence the measurement, a ferromagnetic material should be avoided, and an eddy current sensor, for example, should be selected.

Aside from deformations, it is, for example, also possible for displacements of the rotor unit or of the axis of rotation to be determined. The sequence of the measured values can provide information as to what situation is currently present. In the event of a deformation, it is, for example, the case that a periodically repeating deviation of the distance values, which correlates with the frequency of the rotor unit, is to be expected. A displacement of the axis of rotation may, for example, be associated with a distance value which deviates from a previously measured setpoint or reference value, specifically not only if the rotor unit is displaced along the axis of rotation but also if the axis of rotation of the rotor unit is tilted slightly.

For the evaluation, it is generally advantageous to determine the difference of the present measured values and of the respective reference values in order to be able to identify and evaluate the deviations. Since a temporal sequence of distance values relative to the rotating rotor unit are recorded, it is possible for the measured signal to be broken down into a continuous spectrum by means of a Fourier transformation. As a result, the geometrical deviations, that is to say deviating distance values, are represented in a manner assigned in accordance with the frequency with which they occur. If relatively large, in particular, singularly occurring, geometrical deviations can be seen in the spectrum, it can generally be assumed that an axial run-out error is present.

In order to simplify the evaluation and make it more efficient, the Fourier-transformed sequence does not need to be calculated exactly, but it is rather also possible, for example, for algorithms such as a fast (FFT) or discrete Fourier transformation (FFT) to be used. In this way, the evaluation can also be more easily implemented in an electronics unit of the testing device.

In the analysis of the distance values, the differential formation of the distance values may be performed prior to the Fourier transformation or, conversely, the sequences are initially separately Fourier-transformed, and the difference of the results is subsequently formed. Instead, it is also possible for an average to be formed of the temporal signals, that is to say the measured values of a recorded sequence are each averaged, such that, for example, a sequence of position-related averages is present. The respective averages of the individual sequences are then subtracted from one another in order to detect the deviation.

If an axial run-out error is identified by the testing device, various measures are conceivable. If the error is severe and the running of the rotor unit is greatly influenced, the testing device may transmit the data or corresponding commands to the monitoring unit of the machine tool (for example, the machine controller), in order to possibly even deactivate the machine. It is also conceivable that, in the presence of relatively small deviations, an intervention is performed by means of positioning devices in order to correspondingly align the tool. If local maxima are evident in the evaluation sequence, axial run-out errors may be present. Since each measurement is basically subject to statistical and systematic errors, it is however basically to be expected that deviations in relation to the reference measurement will arise even in normal operation without axial run-out errors. It is therefore advantageous to determine a threshold value above which an axial run-out error must be assumed. This threshold value may, if necessary, also be corrected once again. This evaluation may be performed in a manner implemented by computer. In the Fourier-transformed sequence, at a specific frequency value, for example, at the rotational frequency of the rotor unit, it may be examined whether an exceedance of the threshold value is present. Likewise, it is, for example, the case that the calculated averages are, in accordance with a further evaluation method, position-related, such that in this case, too, at a particular point, it is possible to compare whether or not the threshold value has been exceeded. Deformations at individual points will generally give rise to deviations which arise periodically with the rotational frequency of the rotor unit.

The evaluation sequence which is examined for local maxima may for example have the following calculations:

a differential formation between the first and second temporal sequence and subsequently a Fourier transformation, in particular, a discrete Fourier transformation, preferably an FFT and/or a DFT, of the previously formed differential of the first and second temporal and/or position-related sequence, and/or a Fourier transformation, in particular, a discrete Fourier transformation, preferably an FFT and/or DFFT, in each case of the first and second temporal and/or position-related sequence and subsequently a differential formation between the respectively Fourier-transformed first and second temporal sequences, and/or forming the average of the first and/or second temporal and/or position-related sequence with subsequent differential formation between the averages.

BRIEF DESCRIPTION OF THE DRAWINGS

Exemplary embodiments of the present invention are illustrated in the drawings and will be discussed in more detail below, with further details and advantages being specified.

DETAILED DESCRIPTION OF THE INVENTION

Figure 1:
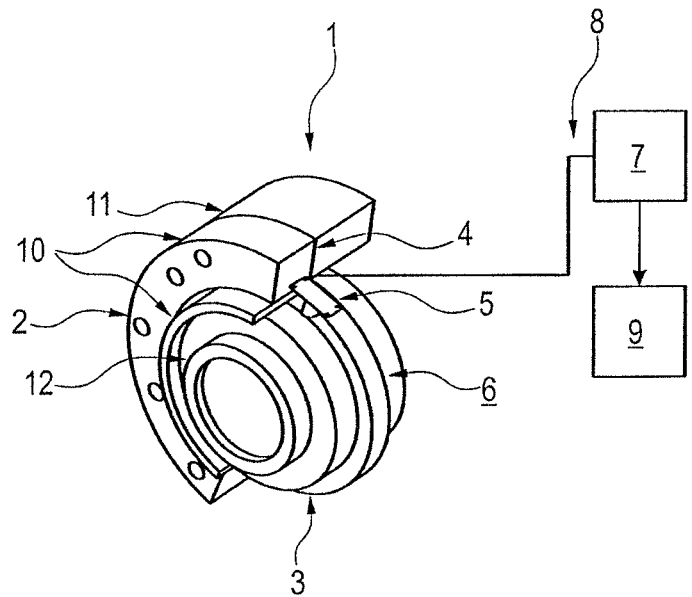
FIG. 1 is a schematic illustration of a machine tool unit according to the present invention.

FIG. 1 is a schematic illustration of a machine tool unit 1 having a stator unit 2 and a rotor unit 3, wherein, in FIG. 1, it is possible to see, in particular, the spindle head as part of the rotor unit 3. The stator unit 2 has a ring 4 to which a sensor head in the form of an axial sensor 5 is attached. The rotor unit 3 comprises a measuring ring 6 composed of aluminum. The axial sensor 5 is arranged so as to measure the distance relative to an end-side surface of the rotor unit 3. This surface relative to which the distance is determined is situated on the measuring ring 6. The axial sensor 5 is in the form of an eddy current sensor in order to be able to obtain the most accurate possible measurements despite possible contamination with dirt.

The sensor head/axial sensor 5 is connected to an electronics unit 7; both together form the testing device 8, which is in turn connected to the machine controller 9, such that interventions into the control can be performed, if necessary, in the event of excessively large axial run-out errors.

In a particularly preferred refinement of the present invention, only one sensor head 5 is provided. It is conceivable for a triggering sensor to additionally be used, for example, for detecting an optical reference marking on the measuring ring 6, wherein a triggering sensor of the type may, for example, also be attached to the sensor ring 4. By means of such a triggering sensor, only the initial point for the measurements is triggered in order that, in the evaluation, it is more easily possible for the phase relationships of the measured values relative to one another to be fixed. A triggering sensor is not imperatively necessary, and is also not illustrated in any more detail in FIG. 1.

The stator unit 2 comprises a covering 10 for the sensor ring 4, and also a bearing cover 11. A tool-holding device 12 is attached to the rotor unit 3 (the conical ring is illustrated in FIG. 1).

Figure 2:
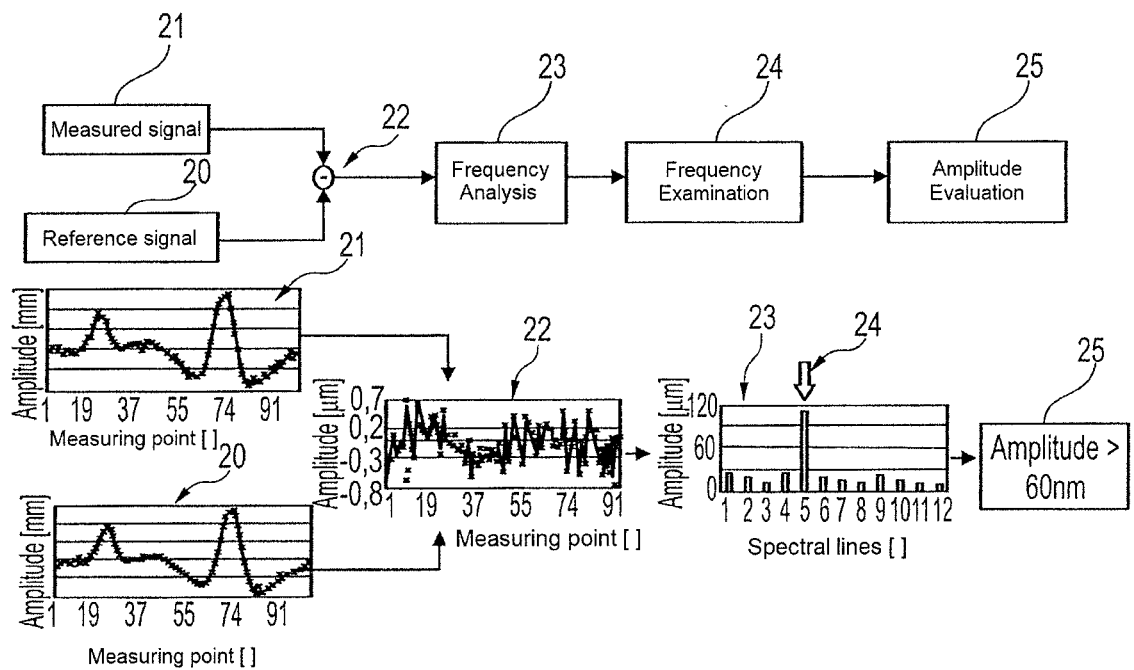
FIG. 2 is a schematic illustration of an extract of the testing method according to the present invention for testing the clamping state.

With the available tools, which are clamped into the tool receptacle, a sequence 20 of reference measured values is in each case initially recorded with the new machine tool unit 1. During operation, a new sequence 21 of distance values is then determined at a later point in time with each tool, generally at a constant rotational speed of the rotor unit 3. In FIG. 2, the difference 22 is formed. A frequency analysis 23 of the signal is subsequently performed in the form of a Fourier transformation. It is checked (method step 24) whether, a maximum is present at a particular frequency, for example, at the rotational frequency of the rotor unit 3, or at what frequencies such maxima appear. If these maxima exceed a threshold value, then, for example, a deformation owing to a chip situated in the tool chuck is present (amplitude evaluation: method step 25).

Figure 3:
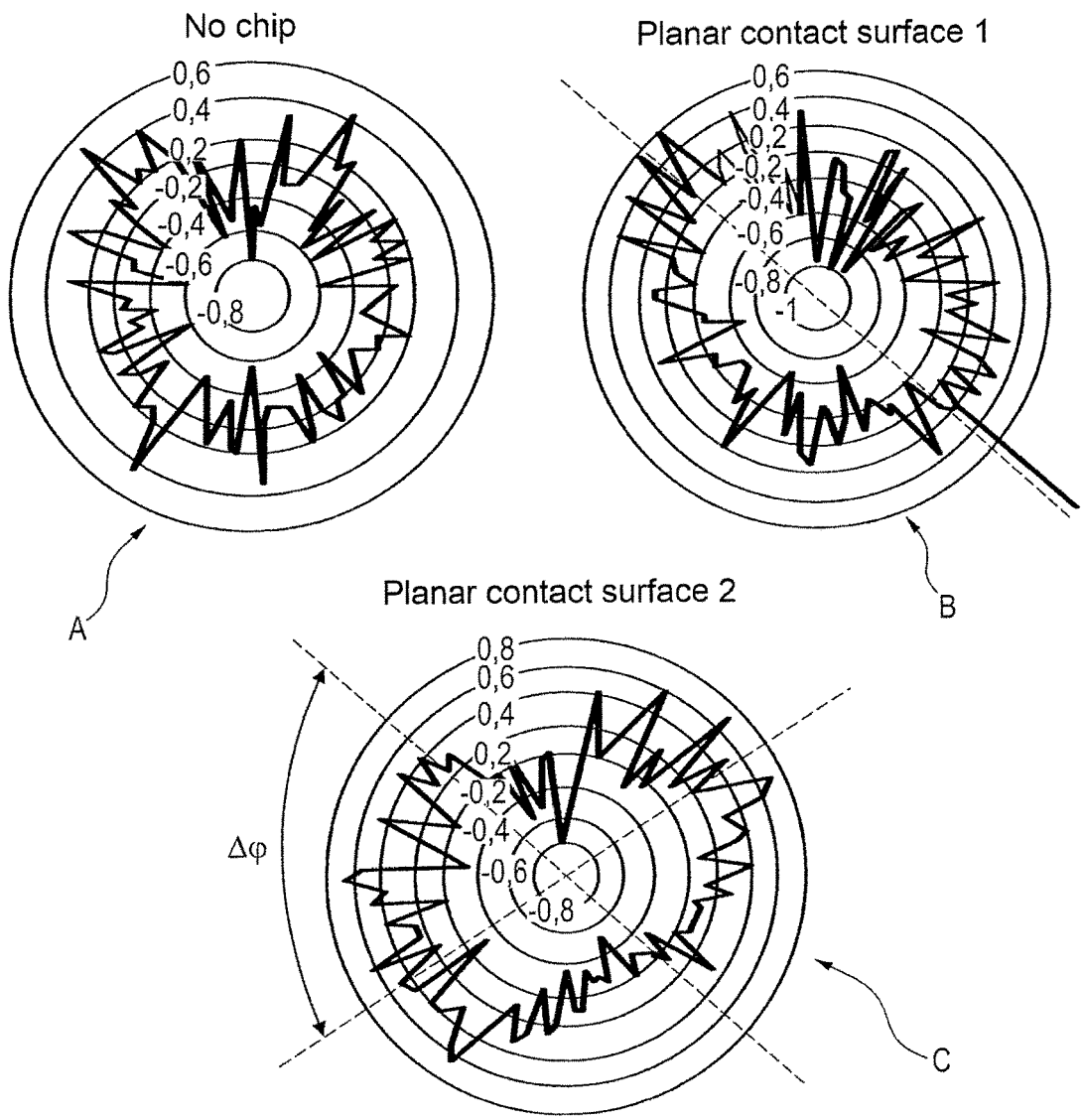
FIG. 3 is an illustration of a deformation pattern as an evaluation result.

FIG. 3 illustrates typical deformation patterns for, wherein, in the illustration A, no chip is present, and the amplitude distribution is much more uniform over the entire angle range, whereas, in the illustration B, a chip has been clamped in the tool holder and gives rise to considerable distortion (between 10-11 o'clock and 4-5 o'clock) with increased amplitudes. The threshold value can also be correspondingly determined. In the illustration C, the chip is situated at a different angular position, such that the illustration C differs from the illustration B primarily with regard to the phase by $\Delta\varphi$.

Figure 4:
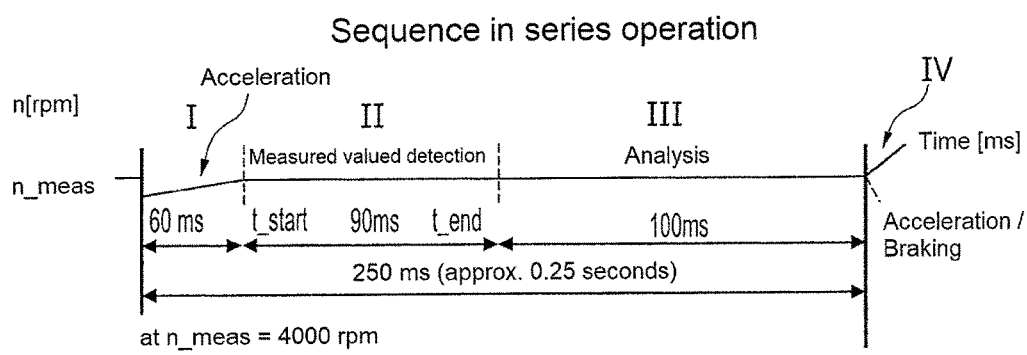
FIG. 4 is a diagram for illustrating the sequence in series operation.

In series operation, the clamping state test can be performed in very short time segments of the start-up phase. In FIG. 4, an acceleration of the rotor unit 3 takes place in the first 60 ms (phase I), then a measured value detection is performed in phase II (duration: approximately 90 ms, at a constant rotational speed of the rotor unit 3). Approximately 100 ms is shown here for the subsequent analysis in phase III. If no axial run-out error can be detected, a further acceleration may be performed in phase IV. Otherwise, for safety reasons, braking must be performed if necessary in phase IV.

LIST OF REFERENCE DESIGNATIONS

1 Machine tool unit
2 Stator unit
3 Rotor unit
4 Sensor ring
5 Axial sensor
6 Measuring ring
7 Electronics unit
8 Testing device
9 Machine controller
10 Covering
11 Bearing cover
12 Conical ring/tool-holding device
20 Reference signal
21 Measured signal
22 Differential operator
23 Frequency analysis
24 Frequency examination
25 Amplitude evaluation
A Deformation pattern (without chip)
B, C Deformation patterns (with chip, at different position)
I Acceleration phase
II Measured value detection
III Analysis
IV Acceleration/braking
$\Delta\varphi$ Phase difference

The invention claimed is:

1. A motor-driven machine tool unit having a stator unit and a rotor unit which is rotatable about an axis of rotation, wherein the rotor unit comprises a spindle head with a tool-holding unit having a tool-clamping device, which is adjustable in a longitudinal direction of the axis of rotation and can be acted upon with a clamping force, for clamping and securing a releasably securable tool, wherein a testing device is provided for testing the clamping state of the tool, said testing device having precisely one sensor head for sensory detection, wherein the sensor head is arranged at a fixed position on the stator unit in such a manner that it measures a distance to an end-side part of the spindle head rotating relative to the sensor head, wherein the testing device records a temporal and/or position-related sequence of at least two distance values and/or of at least two successive series of in each case the at least two distance values, in order in particular solely from the temporal and/or position-related sequence of the distance values to determine an axial run-out error.

2. The machine tool unit according to claim 1, wherein the rotor unit further comprises a measuring ring and the sensor head is arranged in such a manner that it determines the distance to the end-side part of the measuring ring, wherein in particular the measuring ring is designed as a part which is separate from the spindle head, wherein the measuring ring is placed onto the spindle head, or wherein in particular the measuring ring is formed integrally together with the spindle head.

3. The machine tool unit according to claim 2, wherein the measuring ring comprises a reference marking in order, for the recording of the sequence of distance values, to set an initial point for the evaluation, in particular for a differential formation and/or a Fourier transformation, wherein the reference marking is designed as a recess having a groove and/or bore, or as a part protruding from the rest of the measuring ring, or as an optical marking.

4. The machine tool unit according to claim 3, further comprising a triggering sensor in order to detect the reference marking and to set the initial point, wherein the triggering sensor transmits the initial point, in particular the time of detecting the reference marking, to the testing device.

5. The machine tool unit according to claim 2, wherein the sensor head is designed as an eddy current sensor and/or as a capacitive sensor, wherein the measuring ring consists of an electrical conductor, in particular composed of a non-magnetic and/or non-ferromagnetic and/or a para-magnetic material, preferably of aluminum.

6. The machine tool unit according to claim 1, wherein the testing device determines a displacement of the rotor unit and/or of the axis of rotation.

7. A method for testing a clamping state of a tool clamped in a tool-holding unit of a rotor unit of a motor-driven machine tool unit, wherein the tool is secured releasably and is clamped by means of a tool-clamping device of the tool-holding unit, said tool-clamping device being able to be acted upon with a clamping force, wherein, during the clamping of the tool, the tool-clamping device is adjusted in a longitudinal direction of the axis of rotation, wherein the tool-holding unit is arranged in a spindle head of the rotor unit, wherein the machine tool unit has a stator unit, in relation to which the rotor unit is mounted rotatably about an axis of rotation, wherein the method comprises the following method steps:
providing a sensor head for determining a distance,
arranging the sensor head at a fixed position on the stator unit, and
is characterized by the following method steps:
measuring the distance of the sensor head from an end-side part of the rotor unit,
recording a temporal and/or position-related sequence of distance values measured with the sensor head, and
determining an axial run-out error exclusively taking into consideration the temporal sequence of the measured distance values to the end-side part of the spindle head rotating relative to the sensor head.

8. The method for testing according to claim 7, wherein a first temporal and/or position-related sequence of distance values is recorded, said first sequence being used as a reference measurement, for an ideally clamped tool, in particular before a first machining operation by the machine tool unit and/or after a cleaning operation, preferably individually for each tool used, while the rotor unit rotates in relation to the stator unit.

9. The method for testing according to claim 8, wherein a second temporal and/or position-related sequence of distance values is recorded, for a tool clamped in an operating situation, in particular in a later operating situation in comparison to the reference measurement, while the rotor unit rotates in relation to the stator unit, said sequence being used as a comparison measurement for the reference measurement.

10. The method for testing according to claim 9, wherein the first and/or second sequence of distance values is assigned an initial point for evaluation in order, in particular in a differential formation and/or a Fourier transformation, to be able to assign the distance values of the first and second sequence to one another.

11. The method for testing according to claim 7, wherein an evaluation sequence of values is determined by means of at least one of the following calculations:
a differential formation between a first and second temporal sequence and subsequently a Fourier transformation, in particular a discrete Fourier transformation, preferably an FFT and/or a DFT, of the previously formed differential of the first and second temporal and/or position-related sequence, and/or
a Fourier transformation, in particular a discrete Fourier transformation, preferably an FFT and/or DFFT, in each case of the first and second temporal and/or position-related sequence and subsequently a differential formation between the respectively Fourier-transformed first and second temporal sequences, and/or forming an average of the first and/or second temporal and/or position-related sequence with subsequent differential formation between the averages.

12. The method for testing according to claim 11, wherein the evaluation sequence is examined after a maximum or at least two maxima which exceed a predetermined threshold value and, in the event of the threshold value being exceeded, an axial run-out error is assumed.

13. The method for testing according to claim 11, wherein in the evaluation sequence, in particular in the Fourier-transformed sequence, with a frequency value corresponding to a number of revolutions per unit of time of the rotor unit, the differential value of the distances is compared with a threshold value and, in the event of the threshold value being exceeded, an axial run-out error is assumed.

14. The method for testing according to claim 7, wherein a displacement of the rotor unit and/or of the axis of rotation is determined from a difference of the first and second temporal and/or position-related sequence.

\* \* \* \* \*